United States Patent
Matsuda

(10) Patent No.: US 11,607,945 B2
(45) Date of Patent: Mar. 21, 2023

(54) HYBRID VEHICLE

(71) Applicant: KAWASAKI MOTORS, LTD., Akashi (JP)

(72) Inventor: Yoshimoto Matsuda, Kobe (JP)

(73) Assignee: KAWASAKI MOTORS, LTD., Akashi (JP)

(*) Notice: Subject to any disclaimer, the term of this patent is extended or adjusted under 35 U.S.C. 154(b) by 22 days.

(21) Appl. No.: 17/341,087

(22) Filed: Jun. 7, 2021

(65) Prior Publication Data

US 2022/0001736 A1  Jan. 6, 2022

(30) Foreign Application Priority Data

Jul. 2, 2020 (JP) .............................. JP2020-114583

(51) Int. Cl.
*B60K 6/387* (2007.10)
*B60K 6/48* (2007.10)
*B60K 6/547* (2007.10)

(52) U.S. Cl.
CPC ............... *B60K 6/387* (2013.01); *B60K 6/48* (2013.01); *B60K 6/547* (2013.01); *B60K 2006/4825* (2013.01)

(58) Field of Classification Search
CPC .......... B60K 6/387; B60K 6/48; B60K 6/547; B60K 2006/4825
USPC ........................................................ 74/335
See application file for complete search history.

(56) References Cited

U.S. PATENT DOCUMENTS

| | | | | |
|---|---|---|---|---|
| 4,776,227 A | * | 10/1988 | Janiszewski | F16H 3/091 74/357 |
| 5,868,641 A | | 2/1999 | Bender et al. | |
| 8,684,875 B2 | * | 4/2014 | Kaltenbach | B60K 6/48 475/5 |
| 9,463,687 B2 | * | 10/2016 | Kaltenbach | B60W 10/08 |
| 9,533,747 B2 | * | 1/2017 | Arbuckle | B63H 21/20 |
| 9,845,088 B2 | * | 12/2017 | Hoess | B60W 10/08 |
| 10,160,348 B2 | * | 12/2018 | Tsukizaki | B60W 50/032 |
| 10,369,877 B2 | * | 8/2019 | Wu | F16H 3/087 |
| 10,525,827 B2 | * | 1/2020 | Han | B60W 10/02 |
| 10,688,866 B2 | * | 6/2020 | Guo | B60K 6/387 |
| 10,730,382 B2 | * | 8/2020 | Nilsson | F16H 63/062 |
| 10,781,914 B2 | * | 9/2020 | Aulin | B60K 6/405 |
| 11,067,166 B2 | * | 7/2021 | Koyama | F16H 61/0274 |
| 11,236,813 B2 | * | 2/2022 | Nishiyabu | F02B 61/02 |
| 2013/0288850 A1 | * | 10/2013 | Kaltenbach | B60W 10/113 180/65.265 |

FOREIGN PATENT DOCUMENTS

| | | |
|---|---|---|
| DE | 19612690 C1 | 6/1997 |
| DE | 102015202456 A1 | 8/2016 |
| EP | 2492126 A1 | 8/2012 |
| JP | 2015077887 A | 4/2015 |

\* cited by examiner

*Primary Examiner* — Ha Dinh Ho
(74) *Attorney, Agent, or Firm* — Alleman Hall Creasman & Tuttle LLP

(57) ABSTRACT

A hybrid vehicle includes: an engine including a crankshaft; an electric motor including a motor drive shaft; a power transmission shaft to which a total of drive power from the engine and drive power from the electric motor is transmitted; and a switching dog clutch located on a power transmission route from the crankshaft to the power transmission shaft, the switching dog clutch including a switching dog structure slidable to cut off the power transmission route.

15 Claims, 9 Drawing Sheets

HYBRID VEHICLE

CROSS-REFERENCE TO RELATED APPLICATION

This application claims priority to and the benefit of Japanese Patent Application No. 2020-114583, filed on Jul. 2, 2020, the entire disclosure of which is incorporated herein by reference.

BACKGROUND

Technical Field

The present disclosure relates to a hybrid vehicle including an engine and an electric motor.

Description of the Related Art

A hybrid vehicle is known which includes an engine and electric motor as drive sources for travel (see Japanese Laid-Open Patent Application Publication No. 2015-77887). In the configuration of this patent literature, the drive shaft of the electric motor is connected to an input shaft of a transmission, and a friction clutch is disposed between the engine and transmission. This vehicle is switchable between an engine travel mode where the vehicle runs on drive power of the engine and an EV travel mode where the vehicle runs on drive power of the electric motor, and the switching is performed using the transmission or friction clutch.

The use of the transmission or friction clutch for switching from the engine travel mode to the EV travel mode imposes restrictions on the operation of the transmission or friction clutch in the EV travel mode and on the configuration of the transmission or friction clutch.

SUMMARY

A hybrid vehicle according to an aspect of the present disclosure includes: an engine including a crankshaft; an electric motor including a motor drive shaft; a power transmission shaft to which a total of drive power from the engine and drive power from the electric motor is transmitted; and a switching dog clutch located on a power transmission route from the crankshaft to the power transmission shaft, the switching dog clutch including a switching dog structure slidable to cut off the power transmission route.

In the above configuration, the operation efficiency of the hybrid vehicle can be enhanced by selectively changing the state of the switching dog clutch (engagement/disengagement) taking into consideration various factors such as a rotational speed range over which the engine runs efficiently. Additionally, the switching dog clutch is at an upstream location which is closer to the engine than the power transmission shaft to which the total of drive power from the engine and drive power from the electric motor is transmitted. This can increase the flexibility in designing the structures or operations of the power transmission-related components located downstream of the switching dog clutch.

DETAILED DESCRIPTION OF THE EMBODIMENTS

Hereinafter, exemplary embodiments will be described with reference to the drawings.

First Embodiment

Figure 1:
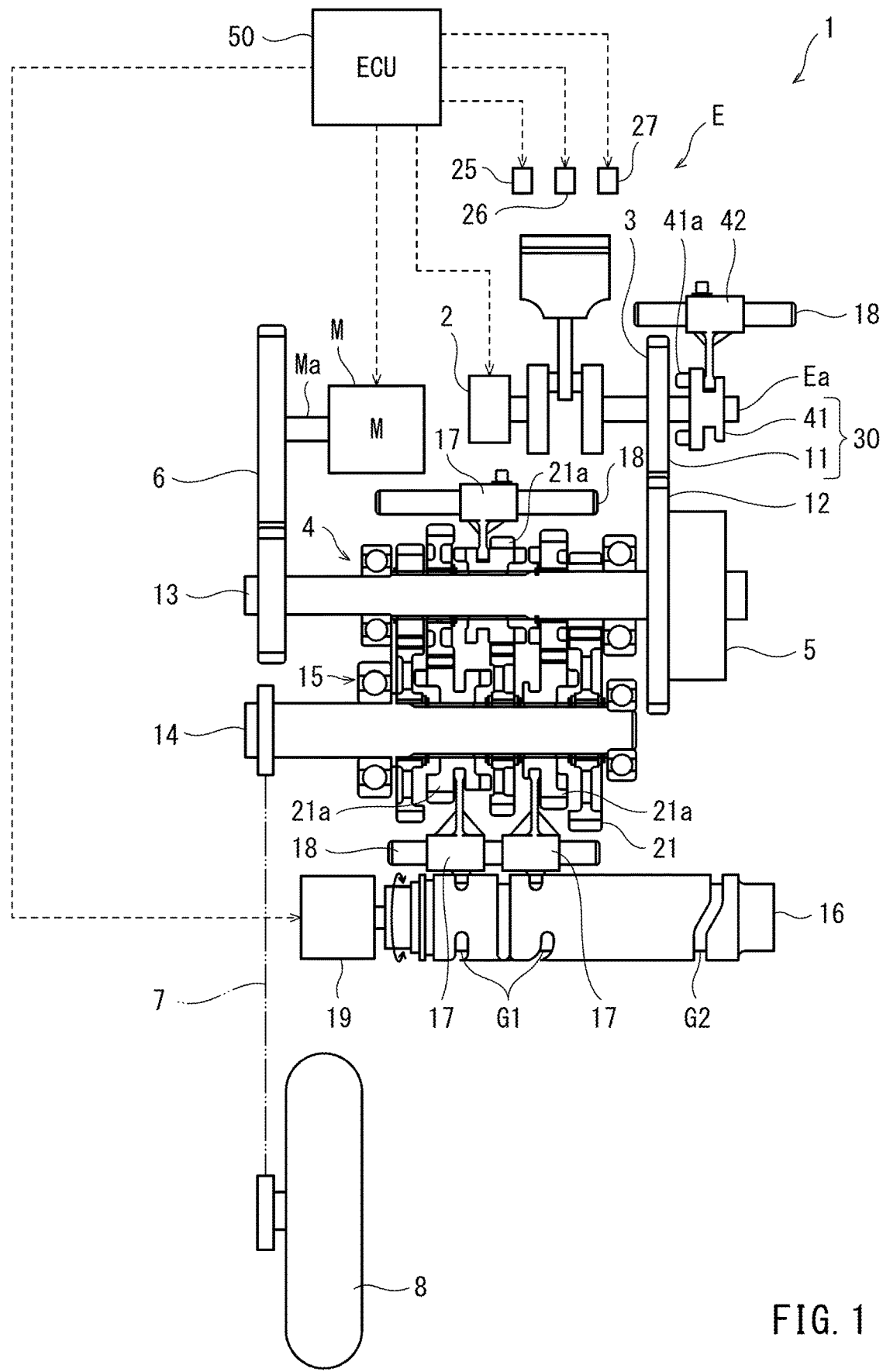
FIG. 1 is a schematic diagram of a hybrid vehicle of a first embodiment.

FIG. 1 is a schematic diagram of a hybrid vehicle 1 of a first embodiment. Although FIG. 1 illustrates a straddle vehicle (such as a motorcycle), the hybrid vehicle 1 may be another type of vehicle. As shown in FIG. 1, the vehicle 1 includes an engine E (internal combustion engine) serving as a drive source for travel, an electric motor M serving as a drive source for travel, and a gear transmission 4 that changes the speed of rotation produced by drive power output by the engine E and/or electric motor M.

The engine E includes an ignition plug 25 for fuel ignition, a fuel injector 26 for fuel supply, and a throttle body 27 for regulation of the amount of intake air. The engine E includes a crankshaft Ea that outputs rotational power. An integrated starter generator (ISG) 2 is mechanically connected to the crankshaft Ea. The electric motor M includes a motor drive shaft Ma that outputs rotational power.

The gear transmission 4 includes an input shaft 13 (power transmission shaft), an output shaft 14, and a speed change mechanism 15 that changes the speed of rotation transmitted from the input shaft 13 to the output shaft 14. The input and output shafts 13 and 14 are parallel to the crankshaft Ea. The speed change mechanism 15 includes a plurality of speed change gear pairs 21 mounted on the input and output shafts 13 and 14. Each speed change gear pair 21 is adapted to transmit power from the input shaft 13 to the output shaft 14, and the different speed change gear pairs 21 have different reduction ratios. The speed change gear pairs 21 include gear-shifting dog gears 21a slidable to select a gear position. In the gear transmission 4, one of the speed change gear pairs 21 is selected by the dog gears 21a, and the speed change is effected by the selected gear pair 21.

A reduction gear pair 3 and a friction clutch 5 (main clutch) are disposed on the power transmission route from the engine E to the input shaft 13. The reduction gear pair 3 includes an engine-side gear 11 mounted on and rotatable relative to the crankshaft Ea and a transmission-side gear 12 mounted on and rotatable relative to the input shaft 13 and meshing with the engine-side gear 11. The friction clutch 5 is located on the axis of the input shaft 13. The friction clutch 5 is operable to cut off the power transmission route from the engine E to the input shaft 13. The friction clutch 5 is, for example, a known multi-plate clutch including an outer structure rotatable together with the transmission-side gear 12 and an inner structure rotatable together with the input shaft 13.

The rotational power output from the motor drive shaft Ma is transmitted to the input shaft 13 through the power transmission mechanism 6. That is, the input shaft 13 is a power transmission shaft to which the total of the drive power from the engine E and the drive power from the electric motor M is transmitted. The power transmission mechanism 6 may be a gear mechanism, chain-sprocket mechanism, or belt-pulley mechanism.

The distal ends of gear-shifting shift forks 17 are engaged with the shifting dog gears 21a. The gear-shifting shift forks 17 are slidably supported by a support shaft 18 parallel to the input and output shafts 13 and 14. A shift drum 16 is placed parallel to the support shaft 18. The outer circumferential surface of the shift drum 16 is provided with gear-shifting guide grooves G1 extending in the circumferential direction of the outer circumferential surface of the shift drum 16. The proximal ends of the gear-shifting shift forks 17 are slidably inserted in the gear-shifting guide grooves G1 of the shift drum 16.

A drum actuator 19 (switching actuator) is mechanically connected to the shift drum 16. Once the drum actuator 19 rotates the shift drum 16, the gear-shifting guide grooves G1 guide the gear-shifting shift forks 17, and a desired one of the gear-shifting shift forks 17 slides along the support shaft 18. The shift fork 17 causes a desired one of the shifting dog gears 21a to slide, thus accomplishing a shift to a desired gear position.

A switching dog clutch 30 is disposed on the power transmission route from the crankshaft Ea to the input shaft 13. The switching dog clutch 30 is located upstream of (closer to the engine than) the friction clutch 5 on the power transmission route. In the example of FIG. 1, the switching dog clutch 30 is located on the axis of the crankshaft Ea.

The switching dog clutch 30 includes: a switching dog structure 41 fitted around the crankshaft Ea; and the engine-side gear 11 with which the switching dog structure 41 is engageable. The switching dog structure 41 is slidable in the axial direction of the crankshaft Ea and rotatable together with the crankshaft Ea. The switching dog structure 41 includes dogs 41a (protrusions) protruding toward dog holes of the engine-side gear 11.

The distal end of a switching shift fork 42 is engaged with the switching dog structure 41. The switching shift fork 42 is slidably supported by the support shaft 18 parallel to the crankshaft Ea. The outer circumferential surface of the shift drum 16 is further provided with a switching guide groove G2 extending in the circumferential direction of the outer circumferential surface of the shift drum 16. The proximal end of the switching shift fork 42 is slidably inserted in the switching guide groove G2 of the shift drum 16. Once the drum actuator 19 rotates the shift drum 16, the switching guide groove G2 guides the switching shift fork 42, and the switching shift fork 42 slides along the support shaft 18.

As a result of the switching dog structure 41 being slid along the crankshaft Ea by the switching shift fork 42, the power transmission route from the crankshaft Ea to the input shaft 13 is established or cut off (regardless of the friction clutch 5). Specifically, engagement of the switching dog structure 41 with the engine-side gear 11 enables the rotational power of the crankshaft Ea to be transmitted to the transmission-side gear 12 through the switching dog structure 41 and the engine-side gear 11. Disengagement of the switching dog structure 41 from the engine-side gear 11 leads to cut-off of the power transmission route between the crankshaft Ea and the reduction gear pair 3.

The shift drum 16 serves both as a drum for moving the gear-shifting shift forks 17 and as a drum for moving the switching shift fork 42. The drum actuator 19 serves both as a gear-shifting actuator for actuating the gear transmission 4 and as a switching actuator for actuating the switching dog clutch 30.

The vehicle 1 includes a controller 50. The controller 50 controls the engine E, electric motor M, ISG 2, and drum actuator 19. The details of the controller 50 will be described later with reference to FIG. 3.

Figure 2:
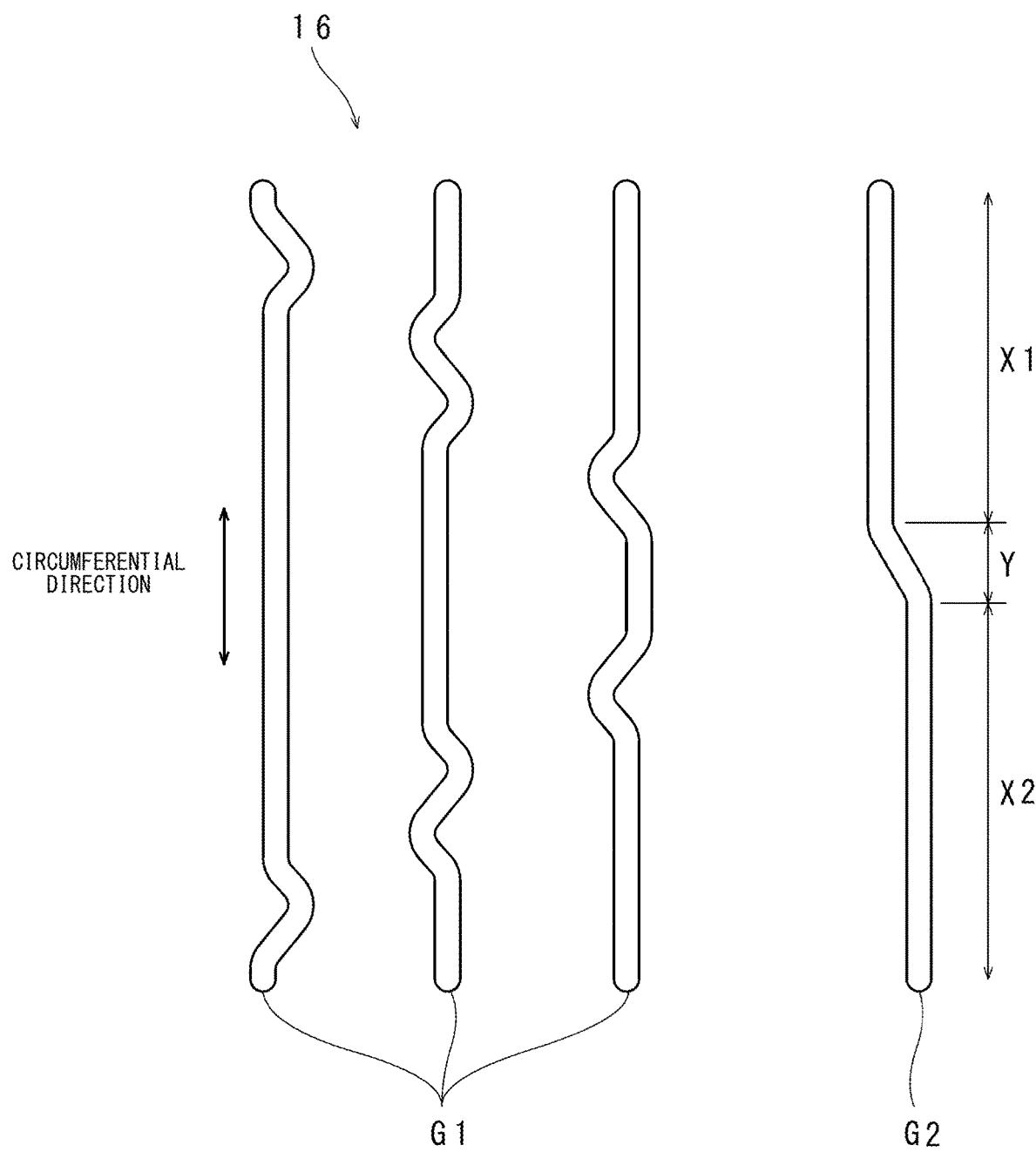
FIG. 2 is a development diagram of a shift drum shown in FIG. 1.

FIG. 2 is a development diagram of the shift drum 16 shown in FIG. 1. As seen from FIG. 2, the gear-shifting guide grooves G1 and the switching guide groove G2 extend side-by-side in the circumferential direction of the outer circumferential surface of the shift drum 16. In the circumferential direction of the shift drum 16, each of the gear-shifting guide grooves G1 and switching guide groove G2 includes a first phase region X1, a second phase region X2, and an intermediate phase region Y between the first and second phase regions X1 and X2.

When the switching shift fork 42 (see FIG. 1) is guided by the first phase region X1 of the switching guide groove G2, the switching dog clutch 30 is in an engaged state. When the switching shift fork 42 is guided by the second phase region X2 of the switching guide groove G2, the switching dog clutch 30 is in a disengaged state. When the switching shift fork 42 is guided by the intermediate region Y of the switching guide groove G2, the switching dog clutch 30 makes a transition between the engaged and disengaged states. The gear transmission 4 may be in the neutral position when the switching shift fork 42 is guided by the intermediate region Y of the switching guide groove G2.

The first and second phase regions X1 and X2 of the gear-shifting guide groove G1 are symmetric with respect to the intermediate region Y of the gear-shifting guide groove G1. In the case where the gear transmission 4 is shiftable between N gear positions (N represents a natural number), the first phase region X1 of the gear-shifting guide groove G1 is involved in shifting between the N gear positions in the EG or HEV mode, and the second phase region X2 of the gear-shifting guide groove G1 is involved in shifting between the N gear positions in the EV mode. In each of the first and second phase regions X1 and X2, the portion associated with the first gear position is closest to the intermediate phase region Y among the portions associated with the N gear positions. In other words, the greater is the distance from the intermediate phase region Y to the location of the gear-shifting shift fork 17 guided by the gear-shifting guide groove G1, the higher is the gear position to which the transmission is shifted.

The first and second phase regions X1 and X2 of the gear-shifting guide groove G1 may be asymmetric with respect to the intermediate region Y of the gear-shifting guide groove G1. For example, the first phase region X1 of the gear-shifting guide groove G1 may be involved in shifting between the N gear positions in the EG or HEV mode, and the second phase region X2 of the gear-shifting guide groove G1 may be involved in shifting between M gear positions in the EV mode (M is an integer equal to or greater than zero and smaller than N).

The drum for moving the switching shift fork 42 may be different from and independent of the drum for moving the gear-shifting shift forks 17 (the same applies to the other embodiments and examples described later). In this case, the switching actuator for actuating the switching dog clutch 30 is different from and independent of the gear-shifting actuator for actuating the gear transmission 4. Thus, the switching dog clutch 30 can be quickly actuated regardless of the gear position of the gear transmission 4 (namely, regardless of the location of the gear-shifting shift fork 17 in the gear-shifting guide groove G1).

Figure 3:
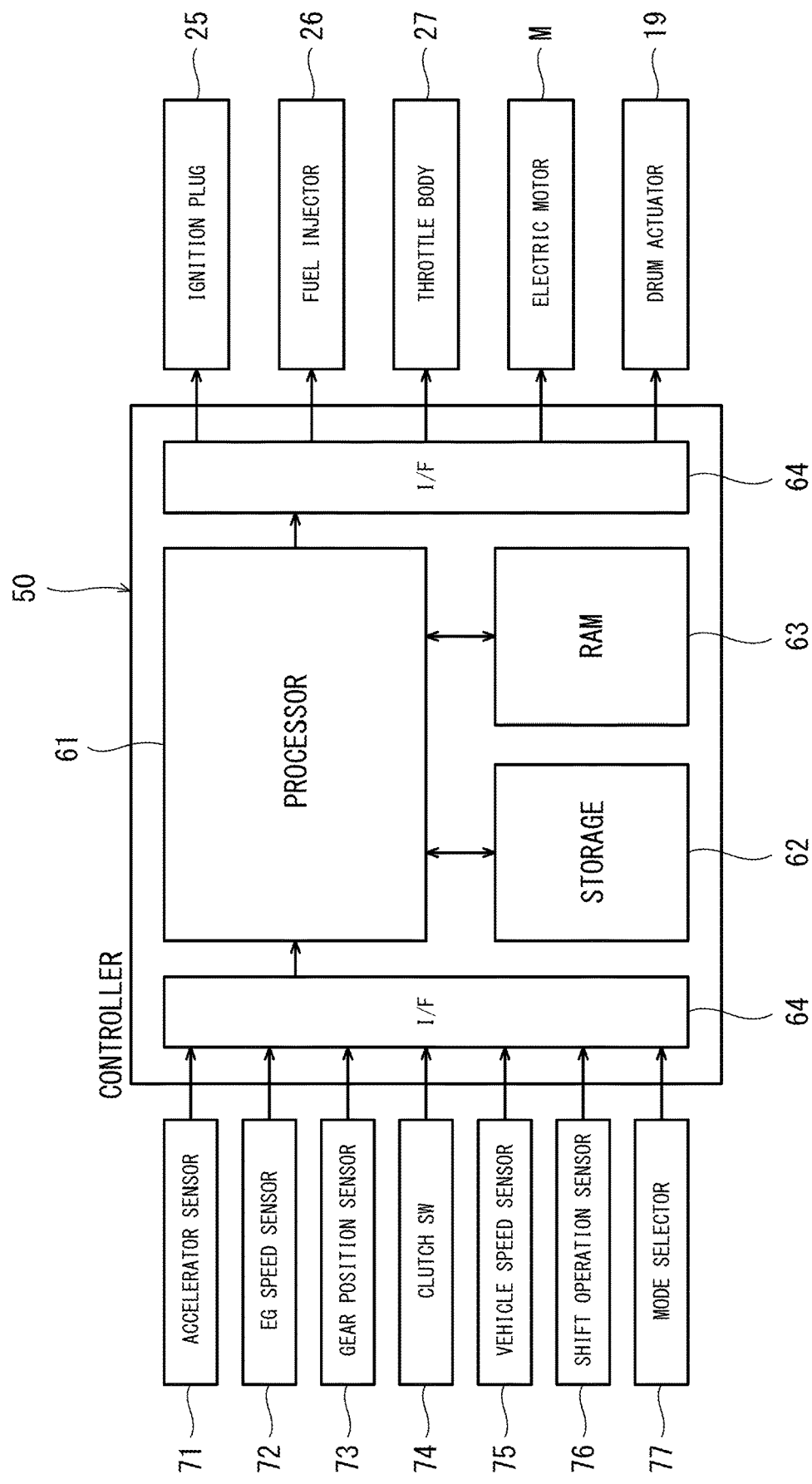
FIG. 3 is a block diagram of a controller and other components shown in FIG. 1.

FIG. 3 is a block diagram of the controller 50 and other components shown in FIG. 1. As illustrated in FIG. 3, the controller 50 is an electronic control unit (ECU). The controller 50 includes a processor 61, a storage 62 (such as a hard disk or flash memory), a main memory 63 (RAM), and an interface 64. The processor 61 carries out various processes based on programs stored in the storage 62 and using the main memory 63.

The ignition plug 25, fuel injector 26, throttle body 27, electric motor M, and drum actuator 19 are electrically connected to the output of the controller 50. To the input of the controller 50 are electrically connected an accelerator sensor 71, an engine speed sensor 72, a gear position sensor 73, a clutch switch 74, a vehicle speed sensor 75, a shift operation sensor 76, and a mode selector 77.

The accelerator sensor 71 detects the amount of accelerator operation performed by the operator. The engine speed sensor 72 detects the rotational speed of the engine E. The gear position sensor 73 detects the current gear position of the gear transmission 4. The clutch switch 74 detects which of the engaged and disengaged states the friction clutch 5 is in. The vehicle speed sensor 75 detects the travel speed of the vehicle 1. The shift operation sensor 76 detects shift operation performed by the operator to select a gear position.

The mode selector 77 detects which of the EG, HEV, and EV modes has been selected by the operator. The EG mode is a mode where a drive wheel 8 is driven only by power from the engine E. The HEV mode is a mode where the drive wheel 8 is driven by both power from the engine E and power from the electric motor M. The EV mode is a mode where the drive wheel 8 is driven only by power from the electric motor M. The mode selector 77 may be configured such that the controller 50 automatically makes mode selections as a function of the state of the vehicle, instead of being configured to allow the operator to make mode selections.

Figure 4:
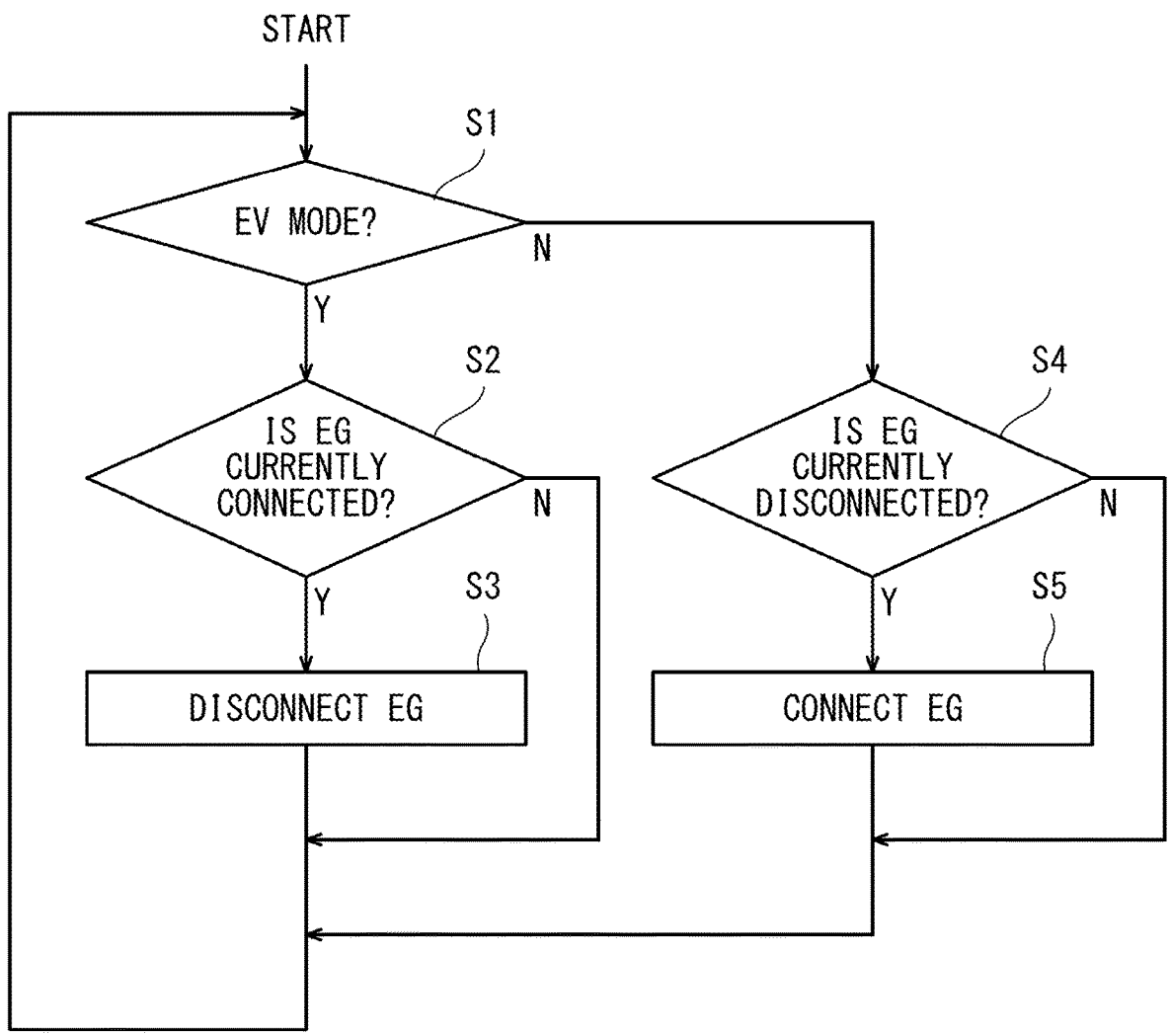
FIG. 4 is a flowchart of control performed by the controller shown in FIG. 3.

FIG. 4 is a flowchart of control performed by the controller 50 shown in FIG. 3. As illustrated in FIGS. 3 and 4, the controller 50 determines whether the mode selector 77 has selected the EV mode (step S1). If the EV mode has been selected (step S1: Y), the controller 50 determines whether the switching dog clutch 30 is currently in an engaged state (engine-connected state) (step S2).

If the switching dog clutch 30 is currently in the engaged state (step S2: Y), the controller 50 drives the drum actuator 19 to bring the switching dog clutch 30 into a disengaged state (engine-disconnected state) (step S3). If the switching dog clutch 30 is currently in the disengaged state (step S2: N), the controller 50 does not drive the drum actuator 19 but leaves the state of the switching dog clutch 30 unchanged.

If the EV mode has not been selected by the mode selector 77, namely, if the EG or HEV mode has been selected (step S1: N), the controller 50 determines whether the switching dog clutch 30 is currently in the disengaged state (engine-disconnected state) (step S4).

If the switching dog clutch 30 is currently in the disengaged state (step S4: Y), the controller 50 drives the drum actuator 19 to bring the switching dog clutch 30 into the engaged state (engine-connected state) (step S5). If the switching dog clutch 30 is currently in the engaged state (step S4: N), the controller 50 does not drive the drum actuator 19 but leaves the state of the switching dog clutch 30 unchanged.

When controlling the drum actuator 19 to change the switching dog clutch 30 from the disengaged state to the engaged state (step S4: Y), the controller 50 may control the rotational speed of the engine E to bring the rotational speed of the switching dog structure 41 closer to the rotational speed of the engine-side gear 11 if the friction clutch 5 is determined to be in an engaged state from information obtained through the clutch switch 74. This allows for smooth engagement of the switching dog structure 41 with the engine-side gear 11.

Specifically, the controller 50 determines the rotational speed of the switching dog structure 41 from information obtained through the engine speed sensor 72, determines the rotational speed of the drive wheel 8 from information obtained through the vehicle speed sensor 75, and determines the speed-increasing ratio of the engine-side gear 11 to the drive wheel 8 from information obtained through the gear position sensor 73. The controller 50 calculates the rotational speed of the engine-side gear 11 based on the rotational speed of the drive wheel 8 and the speed-increasing ratio. The rotational speed of the engine-side gear 11 may be calculated in another way. For example, the controller 50 may acquire the rotational speed of the input shaft 13 with the aid of a sensor and calculate the rotational speed of the engine-side gear 11 based on the rotational speed of the input shaft 13 and the speed-increasing ratio of the engine-side gear 11 to the input shaft 13.

When controlling the drum actuator 19 to change the switching dog clutch 30 from the engaged state to the disengaged state (step S2: Y), the controller 50 may control the engine E to temporarily decrease the output of the engine E. In order to temporarily decrease the output of the engine E, for example, the controller 50 controls the ignition plug 25 such that combustion ceases (i.e., ignition does not occur) during the combustion stroke of the engine E. This allows for smooth disengagement of the switching dog structure 41 from the engine-side gear 11.

In the configuration described above, the operation efficiency of the hybrid vehicle 1 can be enhanced by selectively changing the state of the switching dog clutch 30 (engagement/disengagement) and effecting the switching between the engine-connected state and engine-disconnected state taking into consideration various factors such as a rotational speed range over which the engine E runs efficiently. Additionally, the switching dog clutch 30 is at an upstream location which is closer to the engine E than the input shaft 13 to which the total of drive power from the engine E and drive power from the electric motor M is transmitted. This can increase the flexibility in designing the structures or operations of the power transmission-related components located downstream of the switching dog clutch 30.

Additionally, the switching dog clutch 30 is located upstream of the friction clutch 5 on the power transmission route from the engine E to the input shaft 13. Thus, when the switching dog clutch 30 is in the engaged state and the engine E is used as a drive source for travel, the ratio of power transmission from the engine E to the input shaft 13 can be freely adjusted by operating the friction clutch 5.

Additionally, the switching between the state where the engine E is used as a drive source for travel and the state where the engine E is not used as a drive source for travel is effected by the switching dog clutch 30 which is at an upstream location closer to the engine E than the input shaft 13 of the gear transmission 4. Thus, the flexibility in designing the structure of the gear transmission 4 can be increased.

Additionally, the shift drum 16 for gear shifting of the gear transmission 4 serves also to actuate the switching dog clutch 30. Thus, the hybrid vehicle 1 can be made compact.

Additionally, the switching dog clutch 30 is located on the axis of the crankshaft Ea. Thus, even if the engine E is in operation at the time of disengagement of the switching dog clutch 30, the resistance to the operation of the engine E is low, and the energy loss is small.

First Variant

Figure 5:
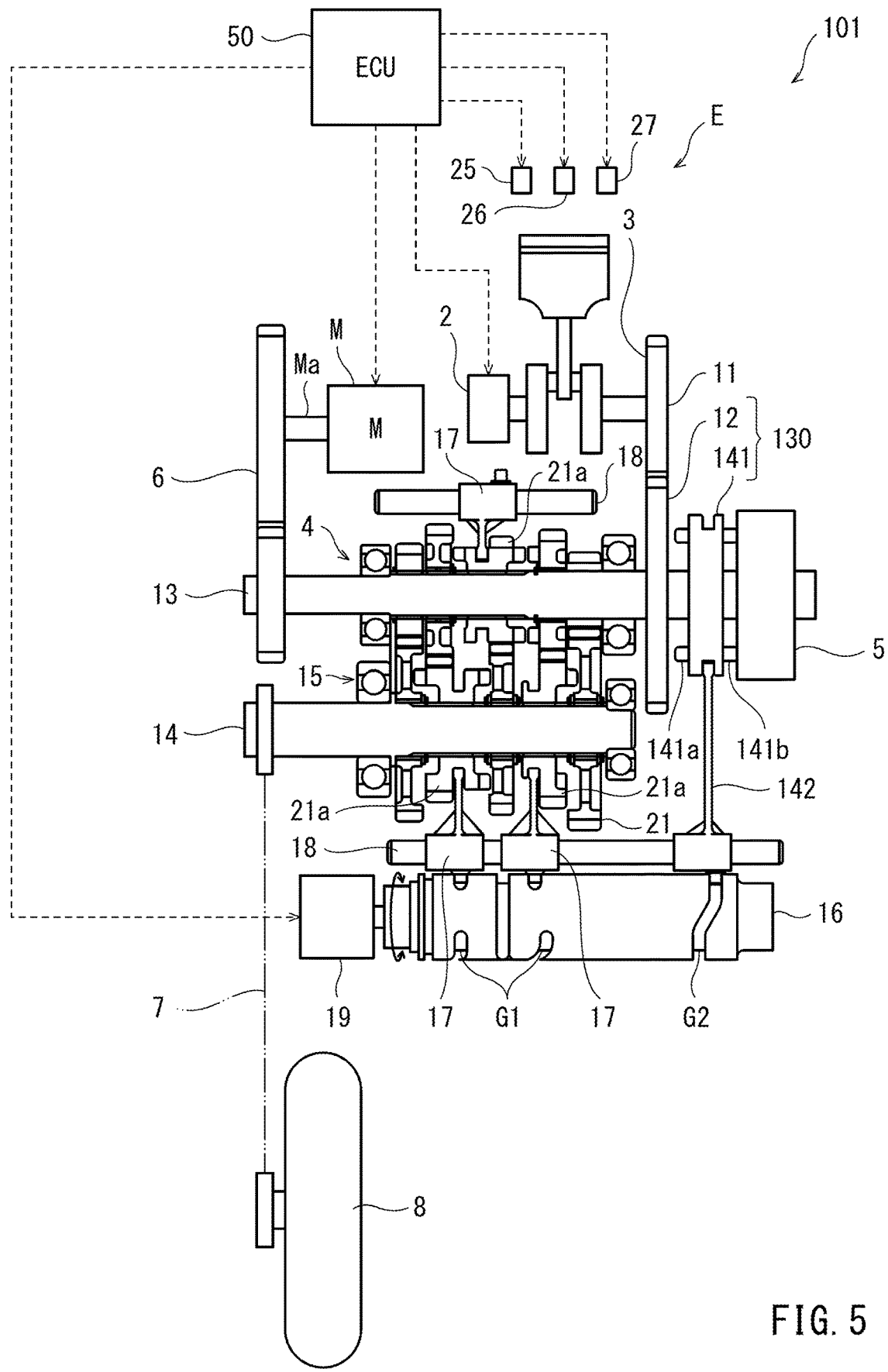
FIG. 5 is a schematic diagram of a hybrid vehicle according to a first variant of the first embodiment.

FIG. 5 is a schematic diagram of a hybrid vehicle 101 according to a first variant of the first embodiment. As illustrated in FIG. 5, the hybrid vehicle 101 includes a switching dog clutch 130 located on the axis of the input shaft 13 of the gear transmission 4. The switching dog clutch 130 includes a switching dog structure 141 fitted around the input shaft 13 and the transmission-side gear 12 with which the switching dog structure 141 is selectively engageable. The switching dog structure 141 is slidable in the axial direction of the input shaft 13 and rotatable relative to the input shaft 13. The distal end of a switching shift fork 142 slidably supported by the support shaft 18 is engaged with the switching dog structure 141.

The switching dog structure 141 includes dogs 141a protruding toward dog holes of the transmission-side gear 12. The switching dog structure 141 always rotates together with the outer structure of the friction clutch 5. Specifically, the switching dog structure 141 includes an engagement slider 141b that is always engaged with the outer structure of the friction clutch 5. That is, the engagement slider 141b has a shape (length) such that the engagement slider 141b remains engaged with the outer structure of the friction clutch 5 even when the switching dog structure 141 slides away from the friction clutch 5 toward the transmission-side gear 12. The engagement slider 141b may be in the form of a dog or in another form (e.g., a spline). The switching dog structure 141 may be adapted to be always engaged with the transmission-side gear 12 and selectively engaged with the outer structure of the friction clutch 5.

Once the drum actuator 19 rotates the shift drum 16, the switching guide groove G2 guides the switching shift fork 142, and the switching shift fork 142 causes the switching dog structure 141 to slide along the input shaft 13. As a result, the power transmission route from the crankshaft Ea to the input shaft 13 is established or cut off. Specifically, engagement of the switching dog structure 141 with the transmission-side gear 12 enables the rotational power of the crankshaft Ea to be transmitted to the friction clutch 5 through the reduction gear pair 3 (the engine-side and transmission-side gears 11 and 12) and the switching dog structure 141. Disengagement of the switching dog structure 141 from the transmission-side gear 12 leads to cut-off of the power transmission route between the reduction gear pair 3 and the friction clutch 5.

In this configuration, the switching dog clutch 130 is located close to the input shaft 13 on the power transmission route from the engine E to the input shaft 13. Thus, when the switching dog clutch 130 is brought into the disengaged state, the resistance to the operation of the electric motor M is low, and the energy loss is small. The other features are the same as those of the example of FIG. 1 and will therefore not be described again.

Second Variant

Figure 6:
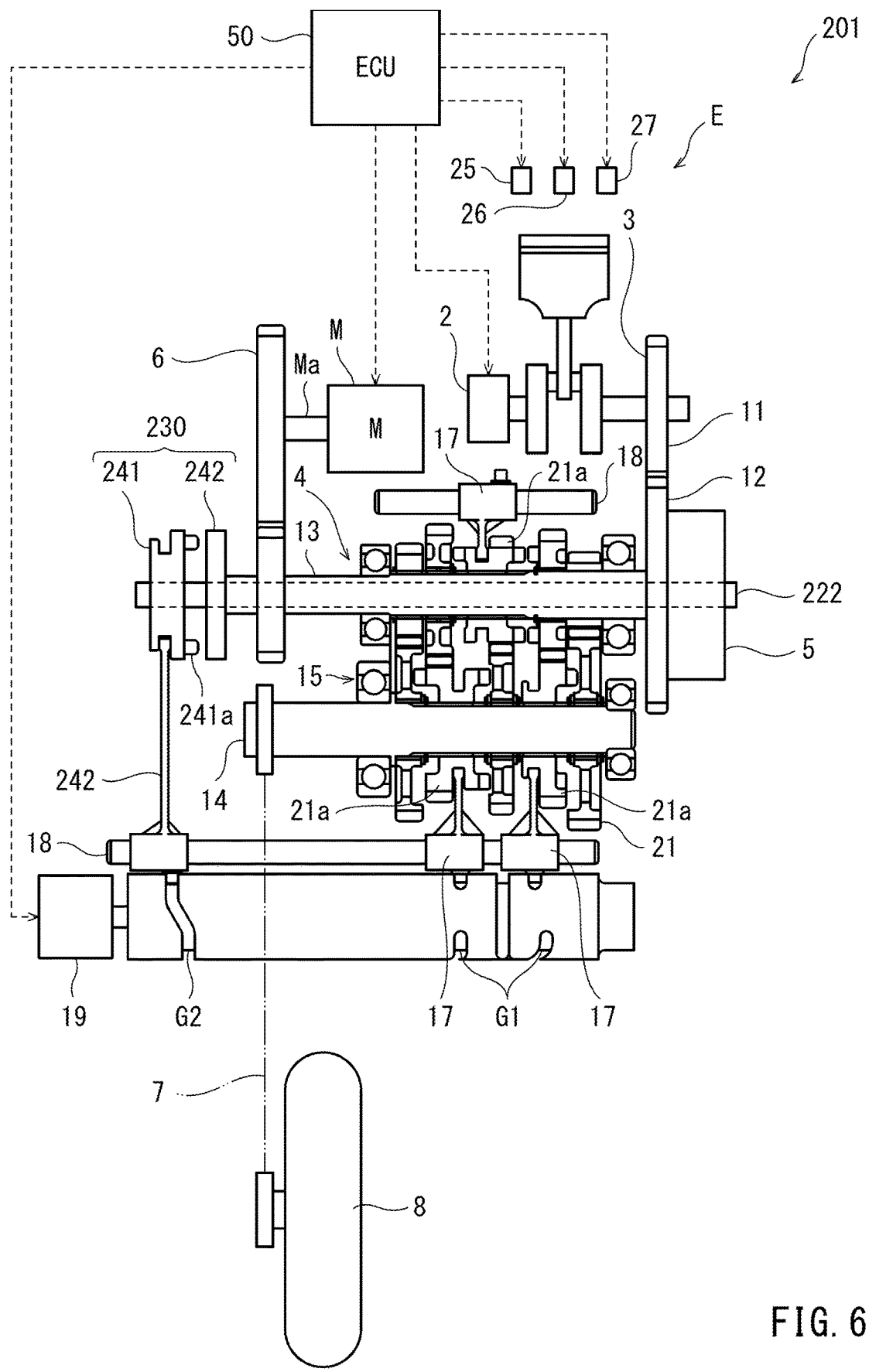
FIG. 6 is a schematic diagram of a hybrid vehicle according to a second variant of the first embodiment.

FIG. 6 is a schematic diagram of a hybrid vehicle 201 according to a second variant of the first embodiment. As illustrated in FIG. 6, the hybrid vehicle 201 includes a switching dog clutch 230 located on the axis of the input shaft 13 of the gear transmission 4. The input shaft 13 is a hollow tube. In the input shaft 13 is inserted an insert shaft 222 rotatable relative to the input shaft 13. The input shaft 13 is shorter than the insert shaft 222.

A first end (e.g., the right end) and a second end (e.g., the left end) of the input shaft 13 are closer to the speed change gear pairs 21 than first and second ends of the insert shaft 222. The input shaft 13 is independent of, and rotatable relative to, the transmission-side gear 12 and friction clutch 5. The first end of the insert shaft 222 is connected to the inner structure of the friction clutch 5 in a manner permitting the insert shaft 222 to rotate together with the inner structure of the friction clutch 5.

The switching dog clutch 230 includes a switching dog structure 241 fitted around the insert shaft 222 and an input shaft-side receiver 242 with which the switching dog structure 241 is selectively engageable. The switching dog structure 241 is slidable in the axial direction of the insert shaft 222 and rotatable together with the insert shaft 222. The distal end of a switching shift fork 242 slidably supported by the support shaft 18 is engaged with the switching dog structure 241. The switching dog structure 241 includes dogs 241a protruding toward the dog holes of the input shaft-side receiver 242. The input shaft-side receiver 242 is not slidable relative to the input shaft 13, but rotatable together with the input shaft 13. For example, the input shaft-side receiver 242 is secured to the second end of the input shaft 13.

Once the drum actuator 19 rotates the shift drum 16, the switching guide groove G2 guides the switching shift fork 242, and the switching shift fork 242 causes the switching dog structure 241 to slide along the insert shaft 222. As a result, the power transmission route from the insert shaft 222 to the input shaft 13 is established or cut off. Specifically, engagement of the switching dog structure 241 with the input shaft-side receiver 242 enables the rotational power of the crankshaft Ea to be transmitted to the input shaft 13 through the reduction gear pair 3, friction clutch 5, insert shaft 222, and switching dog clutch 230. Disengagement of the switching dog structure 241 from the input shaft-side receiver 242 leads to cut-off of the power transmission route between the insert shaft 222 and input shaft 13.

In this configuration, the switching dog clutch 230 is located opposite to the friction clutch 3. Thus, the layout of the components can easily be designed. Additionally, the switching dog clutch 230 is located close to the input shaft 13 on the power transmission route from the engine E to the input shaft 13. As such, when the switching dog clutch 230 is brought into the disengaged state, the resistance to the operation of the electric motor M is low, and the energy loss is small. The other features are the same as those of the example of FIG. 1 and will therefore not be described again.

Second Embodiment

Figure 7:
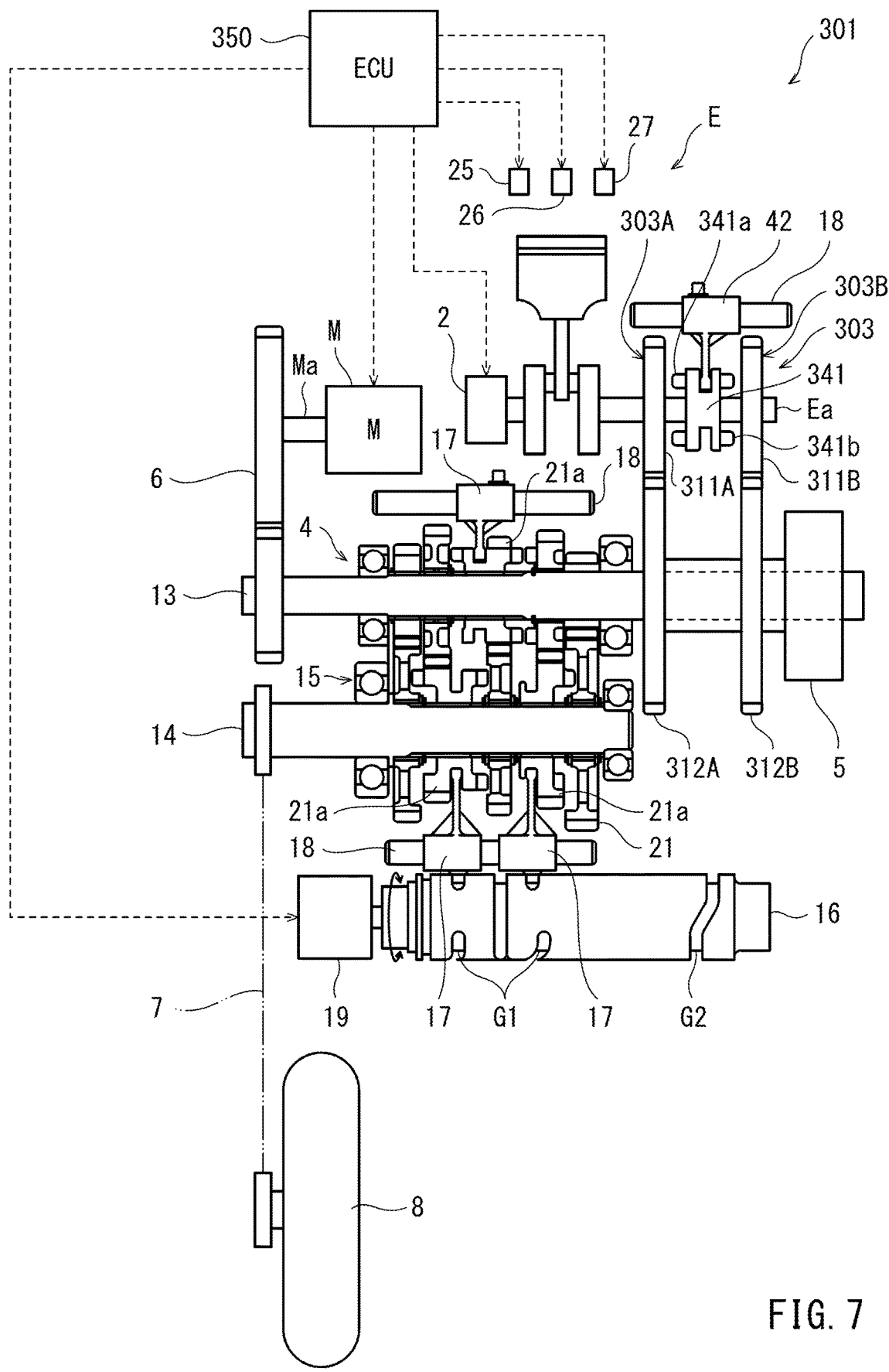
FIG. 7 is a schematic diagram of a hybrid vehicle of a second embodiment.

FIG. 7 is a schematic diagram of a hybrid vehicle 301 of a second embodiment. The elements identical to those of the first embodiment are denoted by the same reference signs and will not be described below. As illustrated in FIG. 7, the hybrid vehicle 301 includes a plurality of (e.g., two) reduction gear pairs 303A and 303B selectively used to transmit power from the engine E to the friction clutch 5. The first and second reduction gear pairs 303A and 303B are spaced from and parallel to each other. The reduction ratio of the first reduction gear pair 303A (first reduction ratio) and the reduction ratio of the second reduction gear pair 303B (second reduction ratio) are different.

The first reduction gear pair 303A includes an engine-side gear 311A mounted on and rotatable relative to the crankshaft Ea and a transmission-side gear 312A mounted on and rotatable relative to an input shaft 13 and meshing with the engine-side gear 311A. The second reduction gear pair 303B includes an engine-side gear 311B mounted on and rotatable relative to the crankshaft Ea and a transmission-side gear 312B mounted on and rotatable relative to the input shaft 13 and meshing with the engine-side gear 311B. The transmission-side gears 312A and 312B are connected to the outer structure of the friction clutch 5 in such a manner as to be rotatable together with the outer structure of the friction clutch 5.

The switching dog clutch 330 includes a switching dog structure 341 fitted around the crankshaft Ea and the engine-side gears 311A and 311B with which the switching dog structure 341 is selectively engageable. The switching dog structure 341 is slidable in the axial direction of the crankshaft Ea and rotatable together with the crankshaft Ea. The distal end of the switching shift fork 42 slidably supported by the support shaft 18 is engaged with the switching dog structure 341.

The switching dog structure 341 includes dogs 341a protruding toward dog holes of the engine-side gear 311A and dogs 341b protruding toward dog holes of the engine-side gear 311B. Once the shift drum 16 rotates the drum actuator 19, the switching guide groove G2 guides the switching shift fork 42, and the switching shift fork 42 causes the switching dog structure 341 to slide along the crankshaft Ea. The switching dog structure 341 is selectively engaged with the engine-side gear 311A, engaged with the engine-side gear 311B, or disengaged from both of the engine-side gears 311A and 311B, thereby establishing or cutting off the power transmission route from the crankshaft Ea to the input shaft 13.

Engagement of the switching dog structure 341 with the engine-side gear 311A enables the rotational power of the crankshaft Ea to be transmitted to the input shaft 13 at the first reduction ratio through the reduction gear pair 303A and friction clutch 5 (first output mode). Engagement of the switching dog structure 341 with the engine-side gear 311B enables the rotational power of the crankshaft Ea to be transmitted to the input shaft 13 at the second reduction ratio through the reduction gear pair 303B and friction clutch 5 (second output mode). Disengagement of the switching dog structure 241 from both of the engine-side gears 311A and 311B leads to cut-off of the power transmission route between the crankshaft Ea and input shaft 13.

Figure 8:
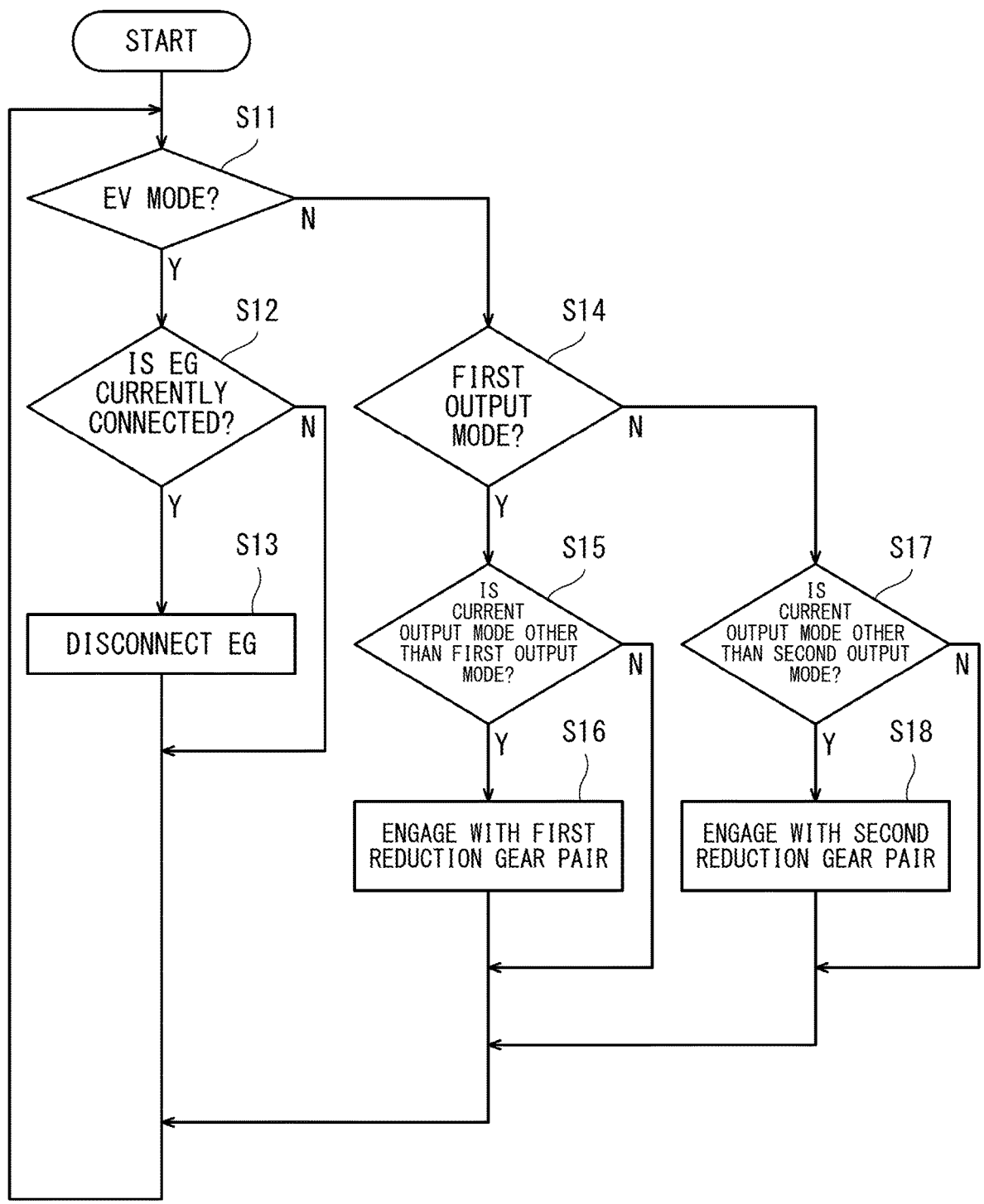
FIG. 8 is a flowchart of control performed by a controller shown in FIG. 7.

FIG. 8 is a flowchart of control performed by a controller 350 shown in FIG. 7. As illustrated in FIG. 8, upon determining that the EV mode has been selected (step S11: Y), the controller 350 determines whether the switching dog clutch 330 is currently in the engaged state (engine-connected state) (step S12).

If the switching dog clutch 330 is currently in the engaged state (step S12: Y), the controller 350 drives the drum actuator 19 to bring the switching dog clutch 330 into the disengaged state (engine-disconnected state) (step S13). If the switching dog clutch 330 is currently in the disengaged state (step S12: N), the controller 350 does not drive the drum actuator 19 but leaves the state of the switching dog clutch 330 unchanged.

Upon determining that the EV mode has not been selected, namely, upon determining that the EG or HEV mode has been selected (step S11: N), the controller 350 determines whether the first output mode has been selected (step S14). Upon determining that the first output mode has been selected (step S14: Y), the controller 350 determines whether the current output mode is other than the first output mode, namely, whether the switching dog structure 341 is currently disengaged from the first reduction gear pair 303A (step S15).

Upon determining that the current output mode is other than the first output mode (step S15: Y), the controller 350 drives the drum actuator 19 to engage the switching dog structure 341 with the engine-side gear 311A of the first reduction gear pair 303A (step S16). Upon determining that the current output mode is the first output mode (step S15: N), the controller 350 does not drive the drum actuator 19 but leaves the state of the switching dog clutch 330 unchanged.

Upon determining that the first output mode has not been selected (step S14: N), the controller 350 determines whether the current output mode is other than the second output mode, namely, whether the switching dog structure 341 is currently disengaged from the second reduction gear pair 303B (step S17).

Upon determining that the current output mode is other than the second output mode (step S17: Y), the controller 350 drives the drum actuator 19 to engage the switching dog structure 341 with the engine-side gear 311B of the second reduction gear pair 303B (step S18). Upon determining that the current output mode is the second output mode (step S17: N), the controller 350 does not drive the drum actuator 19 but leaves the state of the switching dog clutch 330 unchanged.

This configuration allows for selecting which of the first and second reduction gear pairs 303A and 303B is used on the power transmission route from the crankshaft Ea to the input shaft 13. Thus, the reduction ratio between the crankshaft Ea and the input shaft 13 can be varied to enable one vehicle to have different kinds of specifications. The other features are the same as those of the example of FIG. 1 and will therefore not be described again.

Variant

Figure 9:
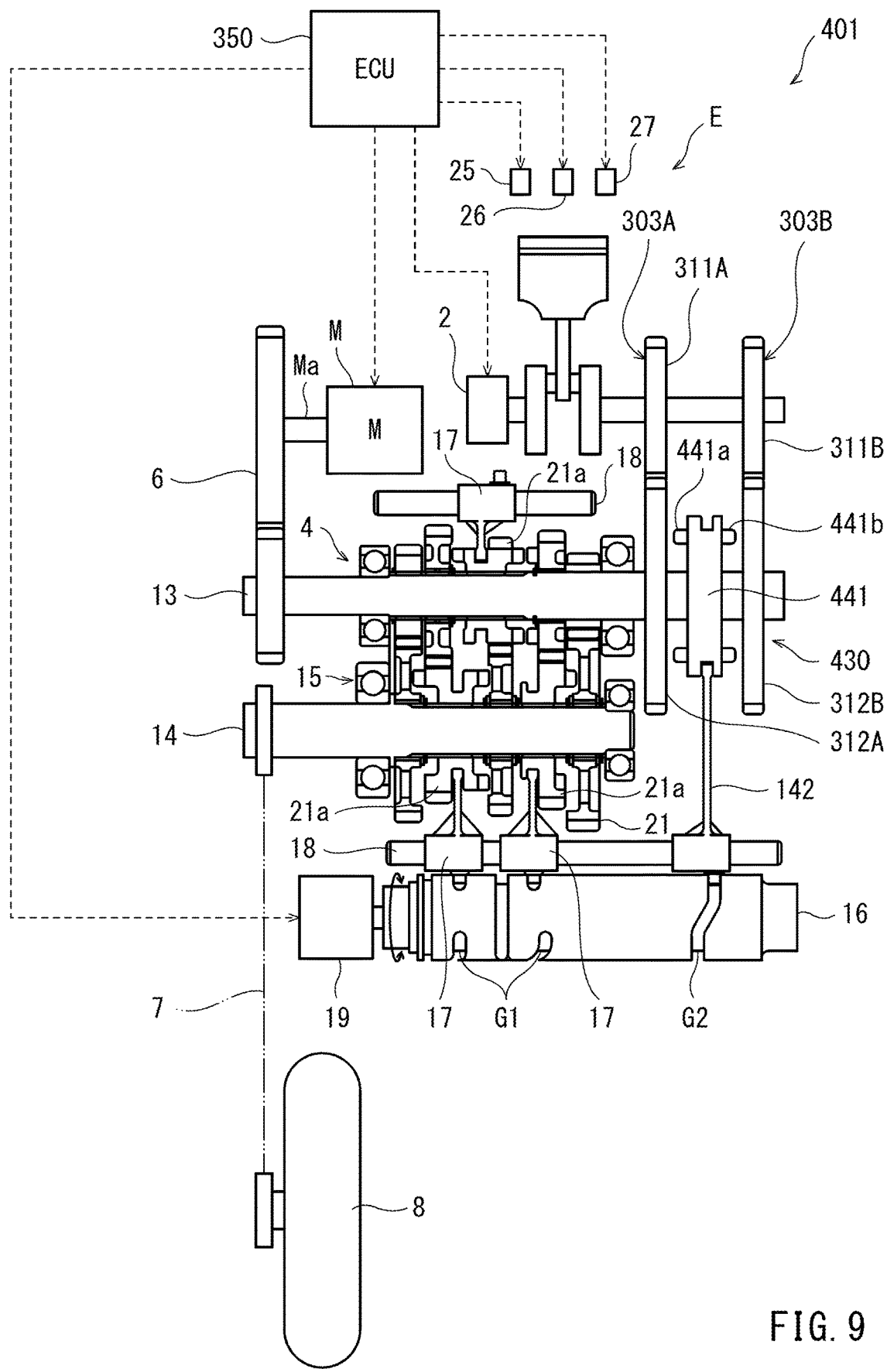
FIG. 9 is a schematic diagram of a hybrid vehicle according to a variant of the second embodiment.

FIG. 9 is a schematic diagram of a hybrid vehicle 401 according to a variant of the second embodiment. The elements identical to those of the second embodiment are denoted by the same reference signs and will not be described below. As illustrated in FIG. 9, the hybrid vehicle 401 includes a switching dog clutch 430 located on the axis of the input shaft 13 of the gear transmission 4. The switching dog clutch 430 includes a switching dog structure 441 fitted around the input shaft 13 and transmission-side gears 312A and 312B with which the switching dog structure 441 is selectively engageable. The switching dog structure 441 is slidable in the axial direction of the input shaft 13 and rotatable together with the input 13. The distal end of the switching shift fork 142 slidably supported by the support shaft 18 is engaged with the switching dog structure 441.

The switching dog structure 441 includes dogs 441a protruding toward dog holes of the transmission-side gear 312A and dogs 441b protruding toward dog holes of the transmission-side gear 312B. Once the drum actuator 19 rotates the shift drum 16, the switching guide groove G2 guides the switching shift fork 142, and the switching shift fork 142 causes the switching dog structure 441 to slide along the input shaft 13.

The switching dog structure 441 is selectively engaged with the transmission-side gear 312A, engaged with the transmission-side gear 312B, or disengaged from both of the transmission-side gears 312A and 312B, thereby establishing or cutting off the power transmission route from the crankshaft Ea to the input shaft 13.

In this configuration, the reduction ratio between the crankshaft Ea and the input shaft 13 can be varied to enable one vehicle to have different kinds of specifications. Additionally, when the switching dog clutch 430 is brought into the disengaged state, the resistance to the operation of the electric motor M is low. The other features are the same as those of the example of FIG. 1 and will therefore not be described again.

The present invention is not limited to the embodiments described above, and modifications, additions, or omissions can be made to the features of the above embodiments. For example, some of the features of one of the embodiments or variants can be extracted separately from the other features of the one embodiment or variant and applied to another of the embodiments or variants.

What is claimed is:

1. A hybrid vehicle comprising:
    an engine including a crankshaft;
    an electric motor including a motor drive shaft;
    a power transmission shaft to which a total of drive power from the engine and drive power from the electric motor is transmitted;
    a switching dog clutch located on a power transmission route from the crankshaft to the power transmission shaft, the switching dog clutch including a switching dog structure slidable to cut off the power transmission route;
    a transmission including an input shaft, an output shaft, and a speed change mechanism that changes speed of rotation transmitted from the input shaft to the output shaft;
    a shift drum; and
    a plurality of shift forks slidable in conjunction with rotation of the shift drum, wherein
    the speed change mechanism includes a gear-shifting dog gear slidable to select a gear position, and
    the shift forks include a gear-shifting shift fork that slides the gear-shifting dog gear and a switching shift fork that slides the switching dog structure.

2. The hybrid vehicle according to claim 1, further comprising a friction clutch located on an axis of the power transmission shaft and operable to cut off the power transmission route,
    wherein the switching dog clutch is located upstream of the friction clutch on the power transmission route.

3. The hybrid vehicle according to claim 1,
    wherein the power transmission shaft is the input shaft of the transmission.

4. The hybrid vehicle according to claim 1, wherein the switching dog clutch is located on an axis of the crankshaft.

5. The hybrid vehicle according to claim 1, wherein the switching dog clutch is located on an axis of the power transmission shaft.

6. The hybrid vehicle according to claim 4, further comprising:
    a first reduction gear pair mounted on the crankshaft and the power transmission shaft in a state where power transmission from the crankshaft to the power transmission shaft is cut off, the first reduction gear pair having a first reduction ratio; and
    a second reduction gear pair mounted on the crankshaft and the power transmission shaft in a state where the power transmission from the crankshaft to the power transmission shaft is cut off, the second reduction gear pair having a second reduction ratio different from the first reduction ratio,
    wherein the switching dog structure is selectively engageable with the first reduction gear pair or the second reduction gear pair to establish the power transmission from the crankshaft to the power transmission shaft through the first reduction gear pair or the second reduction gear pair.

7. The hybrid vehicle according to claim 1, further comprising:
    a switching actuator that actuates the switching dog clutch; and
    a controller that controls the engine, the electric motor, and the switching actuator.

8. The hybrid vehicle according to claim 1, wherein an outer circumferential surface of the shift drum includes:
    a gear-shifting guide groove that guides the gear-shifting shift fork; and
    a switching guide groove that guides the switching shift fork.

9. The hybrid vehicle according to claim 1, further comprising:
    a drum actuator that rotates the shift drum; and
    a controller that controls the drum actuator.

10. The hybrid vehicle according to claim 1, wherein the input and output shafts are parallel to the crankshaft, and the input and output shafts are arranged in a radial direction of the crankshaft.

11. The hybrid vehicle according to claim 1, further comprising:
    a first pair of gears that connects the motor drive shaft to the input shaft;
    a second pair of gears that connects the crankshaft to the input shaft;
    wherein the switching dog clutch is located on the power transmission route from the crankshaft to the input shaft.

12. The hybrid vehicle according to claim 1, wherein the switching dog clutch is mounted on the input shaft.

13. The hybrid vehicle according to claim 1, further comprising a common support shaft that slidably supports the gear-shifting shift fork and the switching shift fork.

14. A hybrid vehicle comprising:
    an engine including a crankshaft;
    an electric motor including a motor drive shaft;
    a transmission including an input shaft, an output shaft, and a speed change mechanism that changes speed of rotation transmitted from the input shaft to the output shaft, the input shaft being parallel to the crankshaft and being arranged in a radial direction of the crankshaft;
    a first pair of gears that connects the motor drive shaft to the input shaft;
    a second pair of gears that connects the crankshaft to the input shaft; and
    a switching dog clutch located on a power transmission route from the crankshaft to the input shaft, the switching dog clutch including a switching dog structure slidable to cut off the power transmission route.

15. The hybrid vehicle according to claim 14, wherein the switching dog clutch is mounted on the input shaft.

* * * * *